United States Patent [19]

Burlitch

[11] Patent Number: 5,019,293

[45] Date of Patent: May 28, 1991

[54] USE OF HYDROGEN PEROXIDE IN PREPARING MAGNESIUM CONTAINING SILICATE SOLS FOR COATING AND FIBER FORMATION

[75] Inventor: James M. Burlitch, Ithaca, N.Y.

[73] Assignee: Cornell Research Foundation, Inc., Ithaca, N.Y.

[21] Appl. No.: 364,106

[22] Filed: Jun. 12, 1989

[51] Int. Cl.$^5$ .................. B01J 13/00; C04B 35/20
[52] U.S. Cl. ...................... 252/313.1; 252/313.2; 501/12; 501/122; 106/286.2
[58] Field of Search ............ 252/313.2, 315.5, 315.6, 252/313.1; 106/286.2; 501/9, 12, 122, 154, 133

[56]  References Cited

U.S. PATENT DOCUMENTS

| 2,384,564 | 9/1945 | Roseman et al. | 252/315.5 |
|---|---|---|---|
| 2,393,625 | 1/1946 | Simons | 423/331 |
| 3,654,176 | 4/1972 | Neumann et al. | 252/315.5 X |
| 3,895,956 | 7/1975 | Yoshida et al. | 106/171 |
| 3,951,838 | 4/1976 | Jayawant et al. | 252/313.2 |
| 3,954,943 | 5/1976 | Neumann et al. | 423/331 |
| 4,049,780 | 9/1977 | Neumann | 423/331 |
| 4,187,192 | 2/1980 | Sheridan | 252/313.1 |
| 4,234,380 | 11/1980 | Kihlstedt et al. | 162/152 |
| 4,415,673 | 11/1983 | Feagin | 501/102 |
| 4,608,215 | 8/1986 | Gonczy | 264/56 |
| 4,835,298 | 5/1989 | Terbot et al. | 501/9 X |
| 4,898,691 | 2/1990 | Borzo et al. | 252/589 |
| 4,898,842 | 2/1990 | David | 501/9 |

OTHER PUBLICATIONS

Ashley, C. S., et al, Mat. Research Symp. Proc. 23, 671–677 (1986).
Burlitch, J. M., et al, Brochure, entry 26-B-89, American Ceramics Society 91st Annual Meeting (published 3 or 4/1989).
Burlitch, J. M., et al, prints of slides from presentation at American Ceramics Society 91st Annual Meeting (4/24–28/1989).
Kurczyk, H., et al, Chem. Abst 93:229982q (1980).
Orcel, G., et al, Material Res. Soc. Symp. Proc. 32, 79–85 (1984).
Yamaguchi, O., et al, Chemistry Letters, 401–404 (1976).
Yamaguchi, O., et al, Chem Abst. 90:12935e(1976).

Primary Examiner—Richard D. Lovering
Assistant Examiner—Daniel S. Metzmaier

[57] ABSTRACT

Stable magnesium containing silicate sols are produced by preparing a solution of silicon alkoxide and of magnesium alkoxide and optionally of aluminum alkoxide in solvent wherein the atomic ratio of Mg to Si ranges from 0.3:1 to 4:1 and simultaneously reacting said alkoxides with peroxy compound or peroxy compound and water. Water presence, rate of addition of reactant, quantity of solvent and temperature of reaction are controlled to negate formation of precipitate. For a magnesium silicate sol, preferably the silicon alkoxide is tetraethylorthosilicate, the magnesium alkoxide is magnesium methoxide, the solvent is methanol and 30% $H_2O_2$ is used as a reactant. For a magnesium aluminosilicate sol, preferably the silicon alkoxide is tetraethylorthosilicate, the magnesium alkoxide is selected from the group consisting of magnesium-s-butoxide and magnesium-2-(2'-methoxyethoxy)ethoxide, the aluminum alkoxide is aluminum isopropoxide, the solvent is sec-butanol and 2-(2'-methoxyethoxy)ethanol and 30% $H_2O_2$ is used as a reactant. A magnesium silicate sol containing unreacted alkoxy can be reacted with HF to produce a magnesium fluoride silicate sol. The sols are used for coating by forming a layer thereof on a substrate and drying. The coating can be converted to ceramic by firing in the case of substrates which are not harmed by the firing method. The sols are used to produce fibers by a process comprising the steps of concentrating, converting to gel fibers, drying and firing.

12 Claims, No Drawings

USE OF HYDROGEN PEROXIDE IN PREPARING MAGNESIUM CONTAINING SILICATE SOLS FOR COATING AND FIBER FORMATION

This invention was made in part with Government support under National Science Foundation grants numbers DMR 85-16616-AO2 and DMR 88-18558. The Government has certain rights in the invention.

TECHNICAL FIELD

This invention is directed to a process for preparing magnesium containing silicate sols and to use thereof in coating substrates and for preparing ceramic fibers. The coatings provide scratch and abrasion resistance and are also useful for providing a compatabilizing layer on a substrate or for providing a wettable film on a hydrophobic substrate (e.g. for fog proofing) or for providing antireflective, antioxidative or friction reducing effect. The fibers are useful for reinforcing and insulation purposes.

BACKGROUND OF THE INVENTION

Yamaguchi, O., et al, Chemistry Letters, 401-404, 1976 discloses simultaneous hydrolysis of Mg and Si alkoxides to provide powders which gave synthetic forsterite, i.e., $Mg_2SiO_4$, on heating. It does not teach coating or fiber formation.

Yamaguchi, O., et al, Chem. Abst. 90: 12935e discloses simultaneous hydrolysis of Mg and Si alkoxides to prepare mixed powders which can be directly formed into enstatite.

Gonczy et al U.S. Pat. No. 4,608,215 discloses admixing a hydrolyzed alcoholic solution of silicon alkoxide with an alcoholic solution of magnesium compound at gelation conditions to form a gel which is dried to provide a powder. The powder is shaped and formed into a densified ceramic by sintering or is indicated to be employable for coating metal substrates useful to provide circuitry functional in an electronic or electric capacity. The problem with using such powders in coating is that they are non-homogeneous and therefore give non-homogeneous results. It does not teach making fibers.

Feagin U.S. Pat. No. 4,415,673 discloses adding a refractory, which can be magnesium silicate, to a zirconia sol and casting the admixture or forming a coating or film wherein the refractory causes gelling. The zirconia sol acts as a bonding agent. Ceramic shapes are produced on firing. Gelling times specifically taught are 1 to 30 minutes. Sols stable over a period of time to allow for shipping in commerce are not enabled. Moreover, the presence of zirconia is required. Furthermore, light transmitting coatings are not taught nor is making fibers from the sol taught.

Kurczyk, H., et al, Chem. Abst. 93: 229982q teaches hydrothermal synthesis to form fibrous chrysotile which is converted to enstatite and fosterite upon heating. Hydrothermal synthesis is disadvantageous is that it requires superatmospheric pressures.

SUMMARY OF THE INVENTION

The invention here involves producing stable, substantially homogeneous, substantially magnesium hydroxide-free, light transmitting magnesium containing silicate sols having gel contents of less than 1% by weight. The sols herein produce more homogeneous coatings than powders and this contributes to their light transmitting properties and allows production of coatings which are largely clear and often crack free and thus are useful on transparent substrates while preserving transparency. To obtain such degree of homogeneity, it is important that the sol be substantially magnesium hydroxide-free and as explained below reaction is carried out to obtain this result. The sols here also have the advantage of being stable over a substantial period of time and therefore provide the commercial advantage of stability during shipping which is not enabled by Feagin U.S. Pat. No. 4,415,673. Furthermore, unlike in Feagin, the sols produced herein can be zirconia-free. Furthermore, the sols herein are useful to produce magnesium containing silicate ceramic fibers without the use of superatmospheric pressure and no prior art has been noted which teaches this.

The magnesium containing silicate sol-forming process herein comprises the steps of:

(a) preparing a solution in solvent of (i) metal alkoxide comprising magnesium alkoxide and (ii) silicon alkoxide in amounts such that the atomic ratio of Mg to Si ranges from 0.3:1 to 4:1 and the solvent is present in an amount ranging from about 40 to about 90% by weight, said solvent being an aliphatic, cycloaliphatic or aromatic compound containing from 1 to 20 carbon atoms and at least one functional group selected from the group consisting of ether and hydroxyl, said magnesium alkoxide having the formula $Mg(OR)_2$ wherein R is an aliphatic, cycloaliphatic or aromatic group which contains from 1 to 20 carbon atoms and optionally at least one functional group selected from the group consisting of ether and hydroxyl, and said silicon alkoxide having the formula $Si(OR')_nQ_m$ wherein R' is $C_1$-$C_4$ alkyl and Q is selected from the group consisting of $C_1$-$C_{20}$ alkyl, $C_2$-$C_4$ alkenyl, phenyl and di-s-butoxylaluminumoxy groups and hydrogen and fluorine atoms and n is 3 or 4 and m is $4-n$;

(b) adding to said solution at a temperature of 10° to 30° C. reactant consisting of an acidic proton-containing peroxy compound or an acidic proton-containing peroxy compound and water over a period of 0.5 hour to 48 hours in an amount ranging from that stoichiometrically equivalent to one alkoxy group of each alkoxide molecule of (i) and (ii) to that stoichiometrically equivalent to all the alkoxy groups of the alkoxide molecules of (i) and (ii), and reacting during said period of addition and/or thereafter, reacting after the period of addition being carried out for up to 4 days at a temperature ranging from 10° C. up to about 65° C., the allocation between peroxy compound and any water, the time period for addition, the quantity of solvent present and the temperature being such that substantially no precipitation occurs, the occurence of reaction being denotable by failure to detect silicon containing compounds in volatiles emanating from the reaction mixture by gas chromatography.

In the process herein where the metal alkoxide is only magnesium alkoxide, most preferably the magnesium alkoxide is magnesium methoxide, the silicon alkoxide is tetraethylorthosilicate, and the solvent is methanol, and the magnesium methoxide is formed in situ by adding magnesium turnings to a solution of tetraethylorthosilicate in methanol, and very preferably the peroxy compound is hydrogen peroxide and it is used in combination with water such that hydrogen peroxide constitutes an amount at least 25% by weight of the combination of water and hydrogen peroxide; preferably, the atomic ratio of Mg to Si is 1:1 so that the sol is convertable to synthetic enstatite, or the atomic ratio of Mg to Si is 2:1 so that the sol is convertible to synthetic forsterite.

In the process herein where the metal alkoxide comprises also aluminum alkoxide, the aluminum alkoxide has the formula Al(OR")$_3$ wherein R" is an aliphatic, cycloaliphatic or aromatic group which contains from 1 to 20 carbon atoms and optionally at least one functional group selected from the group consisting of ether and hydroxyl, and the atomic ratio of Mg to Al ranges from 0.12:1 to 2:1. In a preferred process where the metal alkoxide consists of magnesium alkoxide and aluminum alkoxide, the magnesium alkoxide is selected from the group consisting of magnesium-s-butoxide and magnesium 2-(2'-methoxyethoxy)ethoxide, the aluminum alkoxide is aluminum isopropoxide, the silicon alkoxide is tetraethylorthosilicate, the solvent is sec-butanol and 2-(2'-methoxyethoxy)ethanol and the peroxy compound is hydrogen peroxide and it is used in combination with water such that the hydrogen peroxide constitutes an amount at least 25% by weight of the combination of water and hydrogen peroxide; very preferably the atomic ratio of Mg to Al is about 0.5:1 and the atomic ratio of Mg to Si is about 0.4:1 so that the sol is convertible to synthetic cordierite.

In another embodiment of the process herein, said reactant in step (b) is used in an amount ranging from that stoichiometrically equivalent to 25% of the alkoxy groups of the alkoxide molecules of (i) and (ii) to that stoichiometrically equivalent to 75% of the alkoxy groups of the alkoxide molecules of (i) and (ii) leaving 25% to 75% of the alkoxy groups of the alkoxide molecules of (i) and (ii) remaining, and in a step (c) the sol produced as a result of step (b) is reacted with HF in an amount stoichiometrically equivalent to from 10% to 50% of said remaining alkoxy groups of the alkoxide molecules of (i) and (ii) at a temperature ranging from 10° C. to 40° C. for a time period up to 30 minutes, thereby to produce a magnesium fluoride silicate sol. In a preferred process of this type, the magnesium alkoxide is magnesium methoxide, the silicon alkoxide is tetraethylorthosilicate, the solvent is methanol, the peroxy compound is hydrogen peroxide and and it is used in combination with water such that the hydrogen peroxide constitutes an amount at least 25% by weight of the combination of water and hydrogen peroxide and the addition in step (b) is made over a period ranging from 0.5 hour to 48 hours at room temperature and the HF is added to the sol produced in step (b) as an aqueous solution together with methanol over a period of 1 to 5 minutes at room temperature.

A sol produced by the aforedescribed processes herein is formed into a silicate coating on a substrate by forming a coating of the sol of thickness less than 100 microns on the substrate and drying the coating to remove substantially all the solvent and promote crosslinking. Such coating provides, for example, scratch resistance, wettability, friction reduction, anti-oxidative effect, compatability and/or antireflectivity. Such coating can be crack-free and thus continuous so that easy access by abradants or oxidants is prevented or with a small number of cracks so that such access is minimized. Drying promoting agents can be used to foster or control drying, e.g., hydrochloric acid to foster drying, or 2-(2'-methoxyethoxy)ethanol to control drying to diminish the occurrence of cracking. While such coating is advantageously used on opaque substrates such as carbon-fiber cloth, it provides unique advantage on transparent substrates such as glass, colorless fused silica, polystyrene or polycarbonate as said coating is light transmitting and is clear at least in a large portion thereof. Use of substrate which is resistant to normal silicate firing practices, such as fused silica or alumina, allows conversion of the coating to ceramic with conventional procedures.

Sol produced by the processes herein is formed into ceramic fibers useful for reinforcing or insulation purposes by concentrating the sol by removing solvent therefrom so that it contains less than about 75% by weight of solvent, converting the concentrated sol into gel fibers, drying the gel fibers to remove solvent therefrom and produce green body fibers and converting the green body fibers to ceramic form by heating to a temperature in the range of 850° C. to 1400° C. at atmospheric pressure.

The term "stable" is used herein to mean stable to gel formation over a period of at least two days when stored at room temperature and forming on storage for two weeks or more at room temperature an amount of gel sufficiently small, e.g., 10% by weight or less, so that such gel as is formed can be broken up by ultrasound treatment, for example, for 1 to 2 minutes or by moderate mixing.

The term "substantially homogeneous" is used herein to mean homogenous in a 500 mL sample.

The terms "substantially magnesium hydroxide-free" and "substantially no magnesium hydroxide" are used to mean less than 0.1% by weight Mg(OH)$_2$ in the resulting sol.

The term "magnesium containing silicate" is used herein to mean that at least a major portion of the magnesium atoms are associated with one oxygen and a major portion of the silicon atoms are associated with two oxygens on firing in oxygen or air at 1000° C. for 5 hours.

The term "sol" is used to mean a dispersion of colloidal sized particles in a liquid which is pourable. The term "gel" is used herein to mean such a dispersion which is not pourable.

As indicated above, failure to detect silicon containing compounds in volatiles above the reaction mixture of step (b) indicates reaction has occurred. Analysis for silicon containing compounds in said volatiles can be carried out by sweeping headspace above the reaction mixture with inert gas such as argon, bubbling resulting output stream through diethyl ether which will dissolve any silicon containing compounds in said stream and analyzing for silicon containing compounds in the diethyl ether by highly sensitive gas chromatography, for example, that employing a capillary column and flame ionization detection.

DETAILED DESCRIPTION

The magnesium alkoxides of step (a) are readily prepared by known methods, e.g., by reaction of magnesium metal with an appropriate alcohol. Normally R contains from 0 to 5 of said functional groups. Magnesium C$_{1-4}$ alkoxides, (e.g., magnesium methoxide, magnesium ethoxide, magnesium n-propoxide, magnesium i-propoxide, magnesium n-butoxide, magnesium s-butoxide and magnesium t-butoxide) and magnesium alkoxides having the previously recited formula where R contains 3 to 5 carbon atoms and one or two ether linkages, e.g., magnesium 2-(2'-methoxyethoxy)ethoxide, are preferred. Other suitable alkoxides include, for example magnesium phenoxide, magnesium benzyloxide and magnesium n-dodecanoxide.

The aluminum alkoxides for optional use as a portion of the metal alkoxide of step (a) are readily prepared by known methods, e.g., by reaction of aluminum metal with an appropriate alcohol, e.g., using mercuric chloride or iodine as a catalyst in a suitable solvent or solvent mixture to achieve complete solubility. Normally, R″ contains from 0 to 5 of said functional groups. Aluminum isopropoxide is commercially available. Preferred aluminum alkoxides, include, e.g., aluminum isopropoxide, aluminum n-propoxide, aluminum n-butoxide, aluminum s-butoxide, aluminum t-butoxide and aluminum 2-(2′-methoxyethoxy)ethoxide. Other useful aluminum alkoxides include, for example, aluminum benzyloxide and aluminum n-dodecanoxide.

Where the metal alkoxide is only magnesium alkoxide, it preferably is magnesium methoxide as longer chain lengths require longer formation times. Where the metal alkoxide consists of magnesium alkoxide and aluminum alkoxide, the aluminum alkoxide is preferably aluminum isopropoxide and the magnesium alkoxide is preferably selected from the group consisting of magnesium s-butoxide and magnesium 2-(2′-methoxyethoxy)ethoxide as these are soluble in the s-butanol solvent in which aluminum isopropoxide is soluble.

Turning now to the silicon alkoxide starting material of step (a), as previously indicated it has the formula $Si(OR')_nQ_m$ wherein R′ is $C_1-C_4$ alkyl and Q is selected from the group consisting of $C_1-C_{20}$ alkyl, $C_2-C_4$ alkenyl, phenyl and di-s-butoxylaluminumoxy groups and hydrogen and fluorine atoms and n is 3 or 4 and m is 4−n. Exemplary of these are tetramethylorthosilicate, tetraethylorthosilicate, tetrapropylorthosilicate, and tetrabutylorthosilicate (i.e., the compounds of said formula where R′ is $C_1-C_4$ alkyl and n is 4), methyltriethoxysilane, octadecyltriethoxysilane, vinyltriethoxysilane, allyltriethoxysilane, phenyltriethoxysilane, di-s-butoxylaluminumoxytriethoxysilane, and triethoxysilane, all of which are commercially available, and triethoxyfluorosilane which can be prepared as disclosed in Peppard, D. F., et al, *J. Amer. Chem. Soc.* 68, 76 (1946). Other compounds represented by the above formula are prepared in similar fashion to their homologs or are prepared as described in the 3-volume work, "Organosilicon Compounds" by V. Bazant, V. Chvalovsky and J. Rathousky, Academic Press, N.Y., 1965. The ethoxy compounds are preferred as they are less toxic than the corresponding methoxy compounds and require shorter reaction times than corresponding propoxy and butoxy compounds. Tetraethylorthosilicate is most preferred but note should be made that some of this converts to tetramethylorthosilicate when magnesium methoxide is present in step (a).

Turning now to the solvent for step (a) in the process generally described above, $C_1-C_4$ saturated or unsaturated alcohols are preferred as they are more easily removed when the sol formed herein is used to produce coatings or ceramic fibers. Such alcohols, include, for example, methanol, ethanol, n-propanol, 2-propanol, n-butanol, sec-butanol, t-butanol, vinyl alcohol, allyl alcohol, crotyl alcohol, 1-butene-4-ol and 3-buten-2-ol. Other preferred solvents are 2-(2′-methoxyethoxy)ethanol and 2-methoxyethanol. Other suitable solvents include for example, cyclohexanol, dibutylether, phenol, benzyl alcohol, tetrahydrofuran, dodecanol, coconut alcohol, and tallow alcohol ethoxylated with 10 moles of ethylene oxide.

As previously indicated, the solvent amounts to from about 40% to about 90% of the solution formed in step (a). Where in this range is operative and preferred depends on the particular solvent used and the particular alkoxy groups present in the alkoxides (i) and (ii). More solvent fosters dissolving (i.e., no precipitation) and thinner coating.

In the preferred process herein wherein the metal alkoxide is only magnesium methoxide and the solvent is methanol, the methanol is preferably present in an amount ranging from about 80% to about 85% by weight of the solution formed in step (a).

In the process herein wherein the metal alkoxide consists of magnesium alkoxide and aluminum alkoxide, the solvent preferably should not be pure methanol since exchange occurs with the alkoxide group of the aluminum alkoxide whereby some aluminum methoxide forms which is insoluble in pure methanol and precipitates. In the preferred process herein where the metal alkoxide consists of magnesium s-butoxide, magnesium 2-(2′-methoxyethoxy)ethoxide and aluminum isopropoxide and the solvent is sec-butanol and 2-(2′-methoxyethoxyethanol), the sec-butanol is preferably present in an amount ranging from about 25% to about 88% by weight of the solution formed in step (a) and the 2-(2′-methoxyethoxyethoxy)ethanol is preferably present in an amount ranging from about 2% to about 15% by weight of the solution formed and very preferably the ratio of sec-butanol to 2-(2′-methoxyethoxyethoxy)ethanol on a volume basis is about 9:1.

The solution of step (a) is preferably formed in situ by adding magnesium turnings to a solution of silicon alkoxide and any aluminum alkoxide in alcohol solvent as this allows easy control of the atomic ratio of Mg/Si to that desired.

Very preferably, the solvent used is anhydrous and step (a) is carried out under an anhydrous inert atmosphere, e.g., dry argon or nitrogen, so as to enable precise control of water in the system as too much water can contribute to precipitation or gellation, presumably magnesium hydroxide production, and less homogeneous product in step (b). The in situ formation of the magnesium alkoxide as described above also helps in respect to water control as it ensures that this starting material is not partially hydrolyzed whereby less reactant would be required in step (b) in order to obtain precise water control.

We turn now to step (b).

The peroxy compound for step (b) is one that contains an acidic proton, i.e., an acidic hydrogen. Suitable peroxy compounds include, for example, hydrogen peroxide and hydroperoxides. Suitable hydroperoxides include, for example, methyl hydroperoxide, ethyl hydroperoxide, n-propyl hydroperoxide, i-propyl hydroperoxide, t-butyl hydroperoxide, n-pentyl hydroperxide, 2-$C_5H_{11}$OOH, t-pentyl hydroperoxide, n-hexyl hydroperoxide, n-octadecylhydroperoxide, triphenyl hydroperoxide, cumene hydroperoxide, and 3-hydroperoxycyclohexene. Of the hydroperoxides, lower alkyl, i.e., $C_1-C_4$ alkyl, hydroperoxides are preferred. Of the peroxy compounds, hydrogen peroxide is most preferred.

As indicated above, the peroxy compound and any water are used in an amount in step (b) ranging from that stoichiometrically equivalent to one alkoxy group of each alkoxide molecule of alkoxides (i) and (ii) to that stoichiometrically equivalent to all the alkoxy groups of the alkoxide molecules of the alkoxides (i) and (ii). The stoichiometric equivalence is established by considering that each water molecule is equivalent to one alkoxy group of alkoxide, each hydroperoxy group is equivalent to one alkoxy group of alkoxide and that each hydrogen peroxide molecule is equivalent to two alkoxy groups of alkoxide. Presumably, conversion products include peroxides and hydroperoxides.

If water alone were present as the reactant in step (b) (no peroxy compound), then precipitation occurs due to formation presumably of excessive magnesium hydroxide, and this contributes to lack of homogeneity in the sol and in any coating produced therefrom. The allocation between water and peroxy compound should be such in step (b) that substantially no precipitation occurs in step (b). When the reactant in step (b) is hydrogen peroxide in combination with water, the water in the combination should ordinarily be no more than 75% by weight of the combination. A preferred reactant is 25 to 50% hydrogen peroxide, very preferably 27.5%, 30% or 35% hydrogen peroxide.

It is advantageous to dilute reactant (i.e., peroxy compound and any water) with anhydrous solvent (e.g., 5% by volume reactant and 95% by volume anhydrous alcohol) for addition to the alkoxide solution for reaction in step (b); however, use of too much solvent can decrease the ultimate viscosity obtained to the point where concentration will be necessary to provide a thicker coating. Typically the reactant is added in from 0 to 98.5% by weight solvent with the suitable solvents being the same as for step (a); preferably the solvent used is identical with the solvent of step (a).

As indicated above, the reactant (peroxy compound and any water) is added to the solution formed in step (a) with stirring at a temperature of 10° to 30° C. (i.e., such that this temperature is present on addition) over a period of 0.5 to 48 hours. The time period for addition is selected to avoid the occurrence of precipitation. Where the metal alkoxide is magnesium methoxide and the atomic ratio of Mg to Si is 1:1, the time over which addition of reactant is made normally ranges from about 12 to 48 hours to avoid precipitation. Where the metal alkoxide is magnesium alkoxide and the atomic ratio of Mg to Si is 2:1, the time period over which addition of reactant is made normally ranges from 0.5 to 2 hours to avoid precipitation. Where the metal alkoxide consists of magnesium s-butoxide, magnesium 2-(2'-methoxyethoxy)ethoxide and aluminum isopropoxide and the atomic ratio of Mg to Al is about 0.5:1 and the atomic ratio of Mg to Si is about 0.4:1, a time period over which addition is made without precipitation occurring can be, for example, 8 to 12 hours. Preferably, the addition is carried out dropwise, e.g., using a syringe pump, at a rate ranging from 0.2 ml/hr to 50 ml/hr.

After said addition, reaction, if not yet completed, is carried out over a time period of up to about 4 days.

The temperature of reaction initially after the period of addition (i.e., up to 24 hours after the period of addition) should be in the range of 10° to 30° C. and thereafter can be from 10° C. up to about 65° C. (the reflux temperature where methanol is the solvent). Utilizing temperatures higher than 30° C. too early can result in precipitation so the temperature of reaction should be regulated to avoid precipitation. Where the metal alkoxide is magnesium methoxide and the atomic ratio of Mg to Si is 1:1, temperatures exceeding 30° C. normally can be utilized without precipitation occurring, after 12 to 24 hours of reacting after the period of reactant addition, while where such ratio is 2:1, temperatures exceeding 30° C. normally can be utilized without precipitation occurring after 2 to 3 hours of reacting after the period of reactant addition.

As is indicated above, control of water in step (b) is very important as an excess over that specified above can result in precipitation or gellation and can be deleterious to maximization of homogeneity. Therefore, step (b) is preferably carried out under an anhydrous inert atmosphere, e.g., dry argon or nitrogen.

As previously indicated, control of amount of solvent in step (b) is important as to little can result in precipitation or gellation.

As previously indicated, completion of the reaction is detectable by analysis for silicon containing compounds in headspace gases over the reaction mixture by gas chromatography with failure to detect such compounds indicating completion of reaction. The occurrence of suitable reaction is also detectable by firing sol product under conditions to provide ceramic (e.g., heating at 850° to 1400° C. at atmospheric pressure in an atmosphere of air or oxygen) and determining the presence and amount of MgO, $SiO_2$, $Al_2O_3$ in resulting ceramic.

As previously indicated sols produced by step (b) can be further treated in a step (c) wherein HF is reacted. In a preferred process of this type, the reactant in step (b) is used in an amount ranging from that stoichiometrically equivalent to 40% of the alkoxy groups of the alkoxide molecules of (i) and (ii) to that stoichiometrically equivalent to 60% of the alkoxy groups of (i) and (ii), very preferably in an amount stoichiometrically equivalent to 50% of said alkoxy groups and HF is utilized in an amount stoichiometrically equivalent to from about 15% to about 25% of the remaining alkoxy groups. The stoichiometric equivalence of HF is established by considering that each HF molecule is equivalent to one alkoxy group. Preferably this step (c) is carried out in dry air or a dry inert atmosphere. The HF is typically added as an aqueous solution as it is commercially available in strengths to 70%, normally 48–52%. Very preferably, where step (c) is utilized, the atomic ratio of Mg to Si is 0.75:1 and the atomic ratio of Si to F is 2:1 so that the sol is convertible to synthetic fluorotalc, i.e., $Mg_3(Si_4O_{10})F_2$.

The sols produced by the process herein are stable against gel formation to the extent that less than 1% converts to gel form on storage at room temperature for two days and such amount of gel that forms over longer periods is readily broken up and the original consistency returned by 1–2 minutes of ultrasound treatment or mixing every two weeks. Thus, the consistency of the sols herein can be maintained indefinitely at room temperature by simply treating such with ultrasound or mixing treatment or equivalent thereof every two weeks. Removal of any gel particles by centrifugation prior to use can provide advantage. The sols herein are clear or slightly hazy and in all cases are light transmitting.

We turn now to the embodiment herein wherein the sol is used to provide a coating or film on a substrate.

The substrate can be for example, of glass, polystyrene, polycarbonate, fused silica, alumina or carbon-fiber cloth.

The sol is coated onto the substrate, for example, by smearing or dip coating, to provide a layer of sol on the substrate less than 100 microns thick, normally at least 10 microns thick.

The drying of the sol layer is readily carried out, for example, utilizing temperatures ranging from room temperature up to about 90° C. The time of drying depends on the thickness of the sol layer and normally ranges from about 2 minutes to about 30 hours or more. On drying the coatings normally have thicknesses less than 1 micron thick.

Drying is advantageously carried out utilizing drying promoting agents in admixture with the sol being dried, e.g., hydrochloric acid for dehydration purposes and formamide, N,N-dimethylformamide or 2-(2'-methoxyethoxy)ethanol to reduce cracking during drying.

If desired, multiple coats, i.e., layers of coating, can be applied, e.g., up to 5 coats or more. This is carried out by coating and drying and continuing this succession of steps. For each coating layer the conditions can be the same as described above for one coat. The multiple coats are readily consolidated, e.g., by heating at a temperature of 500° to 700° C. for 1 to 5 hours.

The coatings which are dried but not fired provide some scratch and abrasion resistance and provide compatibilizing, friction reduction, wettability and antioxidative effect, and antireflective function as previously described.

The scratch and abrasion resistance can be increased by firing to convert the coating to ceramic magnesium containing silicate in the case of those substrates that can withstand firing conditions, e.g., those of fused silica or alumina. Such firing is readily carried out, for example, by heating in an atmosphere of air or oxygen to a temperature ranging from about 850° C. to about 1400° C. over a period of 1 to 10 hours and then holding at said temperature for 0 to 2 hours. Such firing besides causing conversion to ceramic burns off carbon which may be present in the coating.

We turn now to the embodiment herein where the sol is used for forming magnesium containing silicate ceramic fibers.

In the fiber forming process, the sol is concentrated, e.g., by rotary evaporation at reduced pressure.

The concentrated sol is converted into gel fibers having diameters, for example, of 0.05 mm to 4 mm and lengths of 0.5 to 2 cm; this is carried out, for example, by extruding (injecting) the concentrated sol into a strongly basic solution (e.g., aqueous ammonia or aqueous sodium hydroxide) and recovering fibrous gel pieces on a screen. Fiber formation is also carried out, for example, by extruding the concentrated sol into the air and onto a surface coated with a substance to reduce adhesion (e.g., fluorocarbon grease or talc). To form gel fibers by extruding onto a surface, concentration of the sol should be such that it includes less than about 15% by weight solvent. To form hollow fibers, the concentrated sol can be coated onto a string or filament which is burned off on processing to convert to ceramic.

Drying of the recovered gel fibers is readily carried out utilizing temperatures ranging from room temperature up to about 90° C. for 8 hours to 3 days.

Firing to convert the fibers to ceramic form is readily carried out under the same conditions a described above for firing coatings.

The ceramic fibers obtained normally have lengths ranging from 1 mm to 2 cm and aspect ratios (length to diameter ratios) of 50 to 200.

The invention illustrated by the following examples:

EXAMPLE I

The entire preparation was conducted under an atmosphere of dry argon. To a solution of 19.0 g (0.0914 mol) of tetraethylorthosilicate in 195 mL of anhydrous methanol (freshly distilled from magnesium methoxide) in a 250 mL Schlenk reaction vessel, was added magnesium turnings (4.445 g, 0.183 mole), to provide an atomic ratio of Mg/Si of 2:1. The mixture was stirred magnetically, while being cooled briefly in a water bath, until all of the metal dissolved and then was transferred into a "medium" porosity fritted filter tube. One half of the clear filtrate, was stored in an addition funnel for three days then was placed in a 1 L 3-necked creased flask equipped with a mechanical stirrer with a Teflon paddle and a water-cooled reflux condenser bearing a gas inlet. The storage funnel was rinsed with ca. 50 mL of dry, distilled methanol and the rinsings were added to the flask. To the stirred mixture was added, dropwise, a solution of 2.57 g of 30% $H_2O_2$ in 50 mL of methanol. After only ca. 6 mL of the solution had been added (10 min), a slight cloudiness was noticed in the reaction mixture and an additional 100 mL of dried methanol was added to the contents of the flask and the addition was completed in one hour. The clear, very pale yellow mixture was stirred for 22 hours; then a solution of 1.64 g (0.0914 mole) of distilled, deionized water in 90 mL of deaerated, reagent grade methanol was added, with stirring, over a 5 hour period. The mixture was stirred for an additional 3.5 hours. After 14 hours the addition funnel was replaced by a thermometer and the slightly hazy mixture was stirred and heated to a slow reflux by an electric heating mantle for 2.5 days and then cooled under argon. The resulting, very slightly hazy sol had a viscosity similar to that of motor oil and was used in the Examples below for preparation of all the films (coatings) with 2:1 atomic ratio (Mg to Si) described below. It was treated with ultrasound for 1-2 minutes every other week to break up a small amount of gel which formed; the original consistency returned to the sol immediately after the treatment. Drying of the sol and firing at 1000° C. produces synthetic forsterite, i.e., $Mg_2SiO_4$.

COMPARATIVE EXAMPLE I

A solution of magnesium methoxide (0.2258 mole) and tetraethylorthosilicate (0.1128 mole) with a 2:1 atomic ratio of Mg to Si, in methanol (total volume, 215 mL) was prepared by the procedure of Example I. When only about 2.5 mL of a solution of 14.2 mL (0.79 mole) of distilled, deionized water in 225 mL of anhydrous methanol (about 0.008 mole of water and no hydrogen peroxide) was added, dropwise, to the stirred solution of alkoxides over a period of one hour, a white precipitate formed. The precipitate dissolved completely upon addition of the remainder of the methanol and water solution to which had been added 25.8 mL (0.48 mole) of glacial acetic acid indicating the precipitate was magnesium hydroxide.

EXAMPLE II

The entire preparation was conducted under an atmosphere of dry argon. To a solution 10.2 g (0.0492 mole) of tetraethylorthosilicate in 100 mL of anhydrous methanol (freshly distilled from magnesium methoxide) in a 250 mL Schlenk reaction vessel, was added magnesium turnings (1.195 g, 0.0491 mole) to provide an atomic ratio of Mg to Si of 1:1. The mixture was stirred magnetically, while being cooled briefly in a water bath, until all of the metal dissolved and then was filtered into a dry, 500 mL 3-necked, creased flask equipped with a mechanical stirrer with a Teflon paddle, and a water-cooled reflux condenser bearing a gas inlet. To the vigorously stirred, clear filtrate was added, dropwise, a solution of 1.4 g of 30% $H_2O_2$ in 100 mL of distilled, anhydrous methanol from an addition funnel, over a 15 hour period. The clear, colorless mixture was allowed to stand for 24 hours; then the addition funnel was replaced by a septum and a solution of 1.3 g of 30% $H_2O_2$ in 50 mL of dry methanol was added, with stirring, from a 60 mL plastic syringe in a motor driven syringe pump, first at a rate of 0.3 mL/hr for the first 15 mL, then at a rate of 1.2 mL/hr for the remainder. The clear, colorless mixture stood for 7 hours. Then a solution of 1.2 g of distilled, deionized water in 20 mL of reagent grade methanol was added by the syringe pump at 0.5 mL/hr. The resulting clear solution was transferred to a 250 mL Schlenk tube and filtered through a "medium" porosity fritted funnel back into the 3-necked flask (to remove a few suspended paper fibers). The apparent viscosity of the clear filtrate gradually increased during the next three days and the mixture because slightly hazy. This sol was used in all examples below for preparation of films (coatings) and fibers wherein the atomic ratio of Mg to Si was 1:1. It was treated with ultrasound for one to two minutes about once a week to break up small amounts of gelled material. Even after four months, the appearance and apparent viscosity were the same and clear films could be made readily, as described below, after removal of a small quantity of gel particles by centrifugation. Drying of the sol and firing at 1000° C. produces synthetic enstatite, i.e., $MgSiO_3$.

EXAMPLE III

When a drop or two of the sol of Example I was smeared on a microscope slide cover, it dried, after a few minutes in air, to a colorless film which showed some cracks in the thicker areas near the edges of the slide.

EXAMPLE IV

Into one 10 mL beaker was placed 0.25 mL of N,N-dimethylformamide (DMF), a small Teflon coated magnetic stirring bar, and 5.0 mL of the sol of Example II. Into another 10 mL beaker was placed 0.25 mL of 2-(2'-methoxyethoxy)ethanol, a small Teflon coated magnetic stirring bar, and 5.0 mL of the sol of Example I. In each case the mixture was stirred for 1 to 2 minutes and the following specimens were dip coated and placed in crystallizing dish covered with a watch glass: fused silica tube section (1×1.5 cm), glass microscope slide cover and alumina substrate. After standing for 9 hours, all the specimens had clear coatings. The silica and alumina pieces had crack free areas near the centers and cracked areas near the edges whereas the coating on the glass slide was cracked all over. The specimens were placed in an oven and heated to 55° C. over a 6 hour period, then to 78° C. and held at that temperature overnight. At the end of this period, the visual appearance of the specimens was unchanged. The alumina and silica specimens were gradually heated to 900° C. in a muffle furnace over a period of about 6 hours and held there ca. one hour. Subsequent inspection of the silica specimens revealed the coatings thereon to be light transmitting and only slightly cloudy. Optical photomicroscopy (500×) showed the silica specimen coated with sol containing DMF was smoother than the one coated with the sol containing 2-(2'-methoxyethoxy)ethanol. Both the coatings on the fused silica specimens and on the alumina specimens provide substantial scratch resistance.

EXAMPLE V

Ten mL of the sol of Example II was transferred to a 10 mL beaker by means of a plastic syringe. Six alumina substrates (ca. 1×2 cm; IBM) were coated by being dipped once into the nearly clear, viscous sol, then drained briefly on a paper tissue and allowed to dry in a loosely covered dish. Two of the six specimens were provided with an additional coating, this time with the sol of Example I. All samples were allowed to air dry for several days. Once dry, the visual appearance of the specimens was unchanged. The dried specimens were heated to either 900° C. or 1200° C. in air. The appearance of the single coated specimens remained unchanged. The double coated specimens, on the other hand became white in color. SEM photographs of the coated specimens revealed extensive cracking and spalling on the double coated specimens but little cracking was seen on the single coated ones.

EXAMPLE VI

A 5 mL sample of the sol of Example II which contained a few small (1×1 mm) lumps, was used to coat, by dipping, three specimens of silica tubing sections (A1-A3), two glass slide covers (B1, B2) and a 0.05 mm polystyrene film which had been exposed to an oxygen stream containing ozone created in an electrical discharge (C). The remainder of the sol (4.5 mL) was centrifuged to remove the lumps. To the supernatant suspension, decanted into a 10 mL beaker containing a magnetic stirring bar, was added three drops of 1:10 (v/v) HCl (prepared with deionized water); no change in appearance or apparent viscosity of the mixture was noticed after stirring it for 5 min. This lump free, slightly cloudy sol was used to dip coat three more silica tubing sections (D1-D3), two glass slides (E1, E2), and two alumina substrates (F1, F2). After air drying under a Petri dish overnight, the coated specimens were found to be predominantly clear, with minor cracks apparent when examined under the microscope. An FT infrared spectrum of the coating on the polystyrene film (with the spectrum of the film removed) contained strong, broad bands at 3600, 1625 and 1025 cm$^{-1}$. The last named band is assigned to Si-O-Si stretching in the coating layer. The specimens were placed in an oven, heated to 70° C. over an 8 hour period, held at 70° C. overnight, then allowed to cool to room temperature. After standing for 5 days, all the specimens were examined. Silica pieces A1-A3 were clear over 20-40% of the coated area with the remainder of the area cracked and flaking. Glass specimens B1 and B2 were clear over 10-30% of the coated area whereas polystyrene film C was nearly clear throughout the entire coated area. A photomicrograph of C (100×) showed minute cracks or crazes evenly distributed over the surface on both sides. Silica pieces D1-D3 were clear over about 80% of the coated area; no crazes were evident either by eye or by photomicroscopy at 100× in the clear areas. Glass pieces, E1 and E2 were clear over 40-50% of the coated area by eye but were seen to be extensively cracked under the microscope. Alumina substrates, F1 and F2, showed no cracks when examined under the microscope at 100×.

EXAMPLE VII

A 5 mL sample of the sol of Example II was centrifuged for 20 minutes in a stopped test tube then decanted into a 4 dram vial which contained a small magnetic stirring bar. To the stirred sol was added 30 microliters of 2-(2'-methoxyethoxy)ethanol. After having been stirred for 5 min., the unchanged, slightly cloudy, viscous sol was dip coated onto two silica tubing sections (G1, G2), two microscope slide covers (H1, H2) and a piece of polycarbonate film (from the lens from a used pair of safely goggles, made by Norton Co.) which had been treated in an ozone-containing oxygen stream for five minutes (I). The specimens were covered with a Petri dish and allowed to dry overnight at ambient temperatures, after which time they were all largely clear. They were placed in an oven, heated to 60° C. during a 3 hr period and held at 60° C. for 10 hours. Careful examination of the pieces revealed that the silica specimens (G1 and G2) were clear and crack free in ca. 50% of their coated areas whereas the coatings on the glass samples (H1 and H2) were covered with hairline and larger cracks. The coating on the polycarbonate piece (I) was clear and showed very few cracks or crazes when observed or photographed at 100×.

EXAMPLE VIII

The sol of Example II which remained after coating of the alumina samples in Example V above was transferred to a 50 mL pear-shaped flask and concentrated to ca. 2 mL by rotary evaporation at a reduced pressure. The resulting nearly clear, honey-like sol was transferred to a 5 mL plastic syringe by aspiration through a 15 gage needle. After the large diameter needle was replaced by a 20 gage 1" long disposable needle, the contents of the syringe were injected into a solution of dilute aqueous ammonia (prepared from ca. 30 mL of conc. ammonia in 2 liters of distilled, deionized water). The injection took place during ca. 20 seconds as the syringe was moved through the ammonia solution. A stringy, nearly transparent gel floated to the surface of the solution behind the moving needle. Samples of this gel were collected by flotation on filter paper or on a platinum gauze and allowed to dry in air; some pieces were between 1 and 2 cm. in length. The hard, brittle, dried gel was colorless and nearly clear. Photomicroscopy revealed that most of the dried gel specimens had a nearly circular cross section and a diameter of ca. 0.1 mm.

EXAMPLE IX

Ten mL of the sol of Example II was concentrated to about 5 mL by rotary evaporation and was injected into two large crystallizing dishes each holding ca. 800 mL of 1:20 aqueous ammonia. The floating gel strands were collected on several pieces of Teflon tape which were placed on watch glasses, covered with filter paper, and allowed to dry in air overnight. After standing in air for 5 days, the clear strands were dried at 80° C. for 3 days; their appearance changed little. Upon being heated to 1000° C. in a silica boat in a tube furnace, dried gel fibers were converted to white ceramic fibers.

EXAMPLE X

Into a dry, argon-filled, 200 mL 3-necked creased flask equipped with a water condenser that was fitted with a gas adapter was placed a solution of 39.8 g (14.14 mmole) of 0.298M aluminum isopropoxide in sec-butanol, 3.71 g (17.8 mmole) of tetraethylorthosilicate, 0.171 g (7.03 mmole) of magnesium turnings and a Teflon coated magnetic stirring bar. The mixture was stirred and heating at a slow reflux with an electric heating mantle for 20 hours during which time very slow gas evolution was observed. To increase the rate of the reaction, 2.0 mL (16.6 mmoles) of dry, distilled 2-(2'-methoxyethoxy)ethanol was added and stirring and heating was continued for five days, after which an additional 2.0 mL of 2-(2'-methoxyethoxy)ethanol was added to dissolve a small amount of crystalline solid which had been formed and to enable a small amount of magnesium metal to react. After being stirred and heated for an additional two days, the nearly clear, colorless mixture was filtered through a "medium" porosity fritted filter tube. The filtrate was diluted with 175 mL of sec-butanol and transferred to a 500 mL 3-necked creased flask equipped with a mechanical stirrer with a Teflon blade, and a water condenser that was fitted with a gas adapter. It is estimated that ⅔ of the magnesium alkoxide was present as magnesium-s-butoxide and the remainder as 2-(2'-methoxyethoxyethoxy)ethoxide. To the stirred, clear, colorless mixture was added two solutions of 30% $H_2O_2$ in sec-butanol (0.6 g in 30 mL and 0.66 g in 20 mL) by means of a syringe pump at a rate of 5 mL/hour. The resulting opaque mixture, which had a viscosity similar to SAE 10 motor oil and contained a small quantity of clear gel, was treated with ultrasound for five minutes during which time it became translucent. An additional 0.34 g of 30% $H_2O_2$ in 10 mL of sec-butanol was added with vigorous stirring at a rate of 2.5 mL/min. The total amount of added 30% $H_2O_2$ (1.6 g) was stoichimetrically equivalent to 90 mmole of alkoxide groups. The result was a gel free translucent sol. Drying and firing of a sample of this at 1400° C. produces synthetic cordierite (2 MgO, 2 $Al_2O_3$, 5 $SiO_2$) which is identified by x-ray powder diffraction. The resulting gel free translucent sol was used to coat flat specimens of glass, polycarbonate plastic (surface activated with ozone), and alumina. Coating was effected by applying a drop or two of the mixture to each specimen and rolling the drop into a thin layer on the substrate by means of a glass rod. After the specimens were dried under glass covers for 4 days they were dried in an electric oven in four stages: 38° C. (8 h); 60° C. (1 d); 68° C. (4 d); 78° C. (17 d). Examination of the specimens with the unaided eye and with a microscope (100×) showed all the specimens to be substantially clear and free of cracks except at the edges.

EXAMPLE XI

Magnesium methoxide was prepared by placing 0.8425 g (0.03465 mole) of magnesium turnings in 200 mL of dry, distilled methanol under argon atmosphere in a 250 mL Schlenk reaction vessel (SRV). After gas evolution had ceased, the slightly cloudy solution was filtered through a "medium" porosity fritted glass tube into a dry, one liter, 3-necked, creased flask which has been fitted with a mechanical stirrer assembly and a water condensor bearing a 3-way gas adapter. The filter was rinsed with four 5 mL portions of distilled methanol which were transferred into the SRV by means of a syringe; the rinsings were filtered into the 1 L flask. After the filter assembly was replaced by a water condensor bearing a 3-way gas adapter, tetraethylorthosilicate (9.625 g, 0.04620 mole) was quantitatively transferred, via a cannula, from a Schlenk tube into the 1 L flask; methanol (2×5 mL) was used to rinse the transfer vessel and the cannula.

To the stirred mixture of alkoxides was added, dropwise at at a rate of 2.5 mL/hr, a solution of 2.25 g. of 30% aqueous $H_2O_2$ (0.127 mole of $H^+$ for protonation of 50% of the alkoxy groups, as described above) in 35 mL of dry, distilled methanol in a 50 mL syringe held in a syringe pump. The clear, colorless solution was stirred for 31 hours under argon at which time gas chromatographic (GC) analysis of the headspace over the reaction mixture showed no volatile silicon-containing species (esp. tetramethylorthosilicate) to be present. GC analysis was carried out on 1 μl portion of a 1 mL solution of anhydrous diethyl ether through which vapors over the reaction mixture had been passed for 3 minutes at a rate of ca. 1 mL/sec. A Hewlett Packard model 5880 gas chromatograph, equipped with a 0.3 mm I.D.×25 meter methyl silicone capillary column and a single flame ionization detector, was used for the analyses. Analyses of synthetic mixtures had showed that as little as 5 mg of tetraethylorthosilicate in 3 mL of alcohol could be detected easily by this procedure.

The reaction mixture was allowed to stand for an additional 18 hours and then was quantitatively transferred, by cannula, to a dry, argon filled, 500 mL volumetric flask that had been modified by addition of a Teflon stopcock at the top of the neck, and equipped with a serum stopper cap. After rinsing the reaction vessel with dry, distilled methanol (6×10 mL), additional methanol (ca. 125 mL) was added to bring the volume to 500.0 mL. A small magnetic stirring bar was placed in the vessel and the serum stopper was replaced by a glass stopper. The clear sol (S) was mixed and aliquots of it, removed by volumetric pipet, were used to prepare magnesium fluoride silicate coatings as follows.

Into a 1 oz. polyethylene bottle, in air, was placed 0.0672 g of 50% aqueous HF (1.68 mmole) and 10 mL of dry methanol. This solution was added dropwise, with magnetic stirring, during a 2 min. period, to 36.4 mL of sol S (3.36 mmole of Si) that was contained in a 100 mL round bottomed flask. The flask was immediately transferred to a rotary evaporator and the clear solution was concentrated, at reduced pressure, to ca. 10 mL and then was transferred to a 10 mL beaker. The clear, colorless concentrate was used to dip-coat two polycrystalline alumina substrates (A) and a small piece of fused silica tubing section (B). The remainder of the concentrate was poured into an alumina boat (12 mL capacity) and was allowed to evaporate in the air. After standing for 9 hours, specimens A and B had clear, essentially crack-free, coatings on them and the alumina boat contained, clear, loose, cracked gel pieces. All the coated pieces were essentially unchanged after being dried at 50° C. for 25 hours.

In another case a mixture of 0.2417 g of 50% HF and 130.8 mL of sol S was divided into two portions, C (90 mL) and D (the remainder). The latter was concentrated to ca. 15 mL by rotary evaporation at reduced pressure and used to brush-coat a 1×3 in. piece of polycarbonate plastic which had been surface-activated in a stream of oxygen and ozone for 5 min. After having dried at room temperature for six hours and in an oven, at 50° C. for 14 hours, the coating was clear and substantially free of cracks; orange and blue colors, due to interference, were observed.

Portion C was placed in a 100 mL graduated cylinder and was used to dip-coat several 2×12 cm strips of carbon fiber cloth (Textile Technologies, Inc., type G 104) with one or three coats; excess sol was removed with a paper towel) and the strips were allowed to air-dry for 30 to 45 min. before a subsequent coat was applied in a similar manner. The coated strips were air-dried at 50° C. as described above for D-coatings, then (to consolidate the coating) were placed in a tube furnace and heated to 650° C. for 3 hrs. under a flowing nitrogen atmosphere and cooled to room temperature; heating and cooling rates were ca. 100° C./hour. The pieces were found to be essentially unchanged in appearance (compared with the uncoated cloth) even when examined under a microscope at a magnification of 100×. As a test of the efficacy of the coatings to provide resistance to oxidation, 2×2 cm pieces of carbon fabric (uncoated, singly coated and triply coated) were placed (at the same altitude) in a 1.5×1×8 cm. alumina boat and held in a furnace at 1000° C. for 5 minutes. Upon removal from the furnace, the percentages of the original fabric mass which had disappeared were determined to be 85, 80 and 78 for the uncoated, singly coated and triply coated pieces, respectively.

When in Examples I and II, stochiometric equivalents of magnesium ethoxide or octadecoxide are substituted for the magnesium methoxide or stoichiometric equivalents of methyltriethoxysilane or triethoxysilane or triethoxyfluorosilane or vinyltriethoxysilane of di-s-butoxylaluminumoxytriethoxysilane are substituted for the tetraethylorthosilicate or others of the peroxy compounds enumerated above are substituted in equivalent amounts for the hydrogen peroxide, viscous, stable substantially homogenous, substantially magnesium hydroxide-free, light transmitting magnesium silicate sols having a gel content of less than 1% by weight are obtained.

Variations will be evident to those skilled in the art. For example, metal alkoxides besides aluminum alkoxide can be included with the magnesium alkoxide in step (a) of the sol producing process herein with adjustment of reactant level to further add the stoichiometric equivalent of additional alkoxide to provide other silicates on drying. Therefore, the scope of the invention is intended to be defined by the claims.

What is claimed is:

1. A process for producing a stable, substantially homogeneous, substantially magnesium hydroxide-free, light transmitting magnesium containing silicate sol having a gel content of less than 1% by weight, said process comprising the steps of:
(a) preparing a solution in solvent of (i) metal alkoxide comprising magnesium alkoxide and (ii) silicon alkoxide in amounts such that the atomic ratio of Mg to Si ranges from 0.3:1 to 4:1 and the solvent is present in an amount ranging from about 40 to 90% by weight, said solvent being an aliphatic, cycloaliphatic or aromatic compound containing from 1 to 20 carbon atoms and at least one functional group selected from the group consisting of ether and hydroxyl, said magnesium alkoxide having the formula $Mg(OR)_2$ wherein R is an aliphatic, cycloaliphatic or aromatic group which contains from 1 to 20 carbon atoms and optionally at least one functional group selected from the group consisting of ether and hydroxyl, and said silicon alkoxide having the formula $Si(OR')_nQ_m$ wherein R' is $C_1$-$C_4$ alkyl and Q is selected from the group consisting of $C_1$-$C_{20}$ alkyl, $C_2$-$C_4$ alkenyl, phenyl and di-s-butoxyaluminumoxy groups and hydrogen and fluorine atoms and n is 3 or 4 and m is 4−n;
(b) adding to said solution at a temperature of 10° to 30° C. reactant consisting of an acidic proton-containing peroxy compound or an acidic proton-containing peroxy compound and water over a period of about 0.5 hours to 48 hours in an amount ranging from that stoichiometrically equivalent to one alkoxy group of each alkoxide molecule of (i) and (ii) to that stoichiometrically equivalent to all the alkoxy groups of the alkoxide molecules of (i) and (ii) and reacting during said addition and also thereafter, the portion of the reacting after the period of addition being carried out for up to 4 days at a temperature ranging from 10° C. up to about 65° C.; the allocation between peroxy compound and any water, the time period for addition, the quantity of solvent present and the temperature of reaction being such that no precipitation occurs, the occurrence of reaction of the silicon alkoxide being denotable by failure to detect silicon containing compounds in volatiles emanating from the reaction mixture by gas chromatography.

2. The process of claim 1 wherein said reactant in step (b) consists of an acidic proton-containing peroxy compound and water.

3. The process of claim 2 wherein the metal containing alkoxide is magnesium methoxide, the silicon alkoxide is tetraethylorthosilicate, the solvent is methanol, and the peroxy compound is hydrogen peroxide and amounts to at least 25% by weight of said reactant.

4. The process of claim 3 wherein hydrogen peroxide amounts to from 25% to 50% by weight of said reactant.

5. The process of claim 4 wherein said atomic ratio of Mg to Si is 1:1 and the addition in step (b) is made over a period ranging from about 12 to 24 hours and a temperature of reaction exceeding about 30° C. is not utilized prior to 12 to 24 hours of reacting after said period of addition.

6. The process of claim 4 wherein said atomic ratio of Mg to Si is 2:1 and the addition in step (b) is made over a period ranging from about 0.5 to 2 hours and a temperature of reaction exceeding about 30° C. is not utilized prior to 2 to 3 hours of reacting after said period of addition.

7. The process of claim 1 wherein the metal alkoxide comprises also aluminum alkoxide having the formula $Al(OR'')_3$ wherein R'' is an aliphatic, cycloaliphatic or aromatic group which contains from 1 to 20 carbon atoms and optionally at least one functional group selected from the group consisting of ether and hydroxyl, and the atomic ratio of Mg to Al ranges from 0.125:1 to 2:1.

8. The process of claim 7 wherein the atomic ratio of Mg to Si is about 0.4:1 and the atomic ratio of Mg to Al is about 0.5:1.

9. The process of claim 8 wherein the metal alkoxide consists of magnesium alkoxide selected from the group consisting of magnesium-s-butoxide and magnesium-2-(2'-methoxyethoxy)-ethoxide and the aluminum alkoxide is aluminum isopropoxide and the silicon alkoxide is tetraethylorthosilicate and the addition in step (b) is made over a period of 5 to 15 hours at room temperature and reaction is completed during the period of addition.

10. The process of claim 1 wherein said reactant in step (b) is used in an amount ranging from that stoichiometrically equivalent to 25% of the alkoxy groups of the alkoxide molecules of (i) and (ii) to that stoichiometrically equivalent to 75% of the alkoxy groups of the alkoxy molecules of (i) and (ii) leaving 25% to 75% of the alkoxy groups of the alkoxide molecules of (i) and (ii) remaining and in step (c) reacting the sol product as a result of step (b) with HF in an amount stoichiometrically equivalent to from 10% to 50% of said remaining alkoxy group of the alkoxide molecules of (i) and (ii) at a temperature ranging from 10° C. to 40° C. for a time period up to 30 minutes.

11. The process of claim 10 wherein the atomic ratio of Mg to Si is 0.75:1 and the atomic ratio of Si to F is 2:1.

12. The process of claim 11 wherein the HF is added over a period of 1 to 5 minutes at room temperature.

* * * * *